United States Patent
Davison et al.

(10) Patent No.: US 8,043,675 B2
(45) Date of Patent: Oct. 25, 2011

(54) PACKAGED GLASS SEALANTS

(75) Inventors: Anthony Paul Davison, Crewe (GB); Robert Herbert White, Knighton (GB)

(73) Assignee: Bostik, S.A., Paris (FR)

( * ) Notice: Subject to any disclaimer, the term of this patent is extended or adjusted under 35 U.S.C. 154(b) by 73 days.

(21) Appl. No.: 11/695,489

(22) Filed: Apr. 2, 2007

(65) Prior Publication Data
US 2007/0270541 A1   Nov. 22, 2007

Related U.S. Application Data

(63) Continuation of application No. PCT/EP2005/010370, filed on Sep. 26, 2005.

(30) Foreign Application Priority Data

Oct. 1, 2004   (GB) .................................. 0421856.6

(51) Int. Cl.
*B29D 22/00* (2006.01)
(52) U.S. Cl. ....... 428/35.7; 524/574; 524/524; 524/505; 524/525; 524/523; 524/522; 524/528; 524/519; 524/514
(58) Field of Classification Search ............... 524/574, 524/524, 505, 525, 523, 522, 528, 519, 514; 428/35.7
See application file for complete search history.

(56) References Cited

U.S. PATENT DOCUMENTS

| 4,169,822 | A | * | 10/1979 | Kutch et al. | 523/450 |
| 5,301,835 | A | * | 4/1994 | Fulks et al. | 222/95 |
| 5,373,682 | A | | 12/1994 | Hatfield et al. | |
| 5,632,122 | A | * | 5/1997 | Spinks | 52/172 |
| 6,121,354 | A | | 9/2000 | Chronister | |

FOREIGN PATENT DOCUMENTS

| EP | 0 469 564 A1 | 2/1992 |
| EP | 0 957 029 A1 | 11/1999 |
| WO | WO 2004/081138 | 9/2004 |

* cited by examiner

*Primary Examiner* — Peter D Mulcahy
(74) *Attorney, Agent, or Firm* — Hunton & Williams LLP

(57) ABSTRACT

A packaged glass sealant product, is formed of a sealant composition having a processing temperature in the range of from greater than 70° C. up to 220° C. and a skin of thermoplastic polymeric material around said sealant composition. The skin constitutes no more than 10 wt % of the total weight of said product, and said polymeric material has a minimum film forming temperature of at least 50° C. and a softening point which is lower than the processing temperature for application of said sealant composition by a difference of more than 10° C. The product alleviates the necessity of disposing of non-recyclable, silicone coated packaging by environmentally unfriendly methods in particular land-fill.

18 Claims, No Drawings

PACKAGED GLASS SEALANTS

This application is a continuation of PCT/EP2005/010370, which was filed on Sep. 26, 2005.

The present invention is concerned with packaged glass sealants and with their method of manufacture. More particularly, though not exclusively, the present invention concerns packaged glass sealants useful in the manufacture of double glazing sealed units for windows.

BACKGROUND OF THE INVENTION

As consumers demand guaranteed performance of double glazed windows, manufacturers of the windows similarly demand performance guarantees from their suppliers of the components which they employ to make the double glazing units. In this regard, the formulators of sealants used to seal the edge of the double glazing units are generally required to provide the units' manufacturers with assurances, if not guarantees, concerning the performance of the sealants. For a composition to be successful as a sealant useful in the manufacture of double glazed window units, it must be formulated to provide both short-term and long-term (i.e. at least 10 years, preferably at least 15 years, more preferably at least 20 years or more e.g. 25 years) bonding of the sealant to the glass. The short-term bonding properties of the sealant to the glass are important, as it is the sealant which holds the components of the unit together prior to the unit being fitted in a window. The long-term bonding properties of the sealant to the glass are important, as it is the sealant which renders the unit weatherproof (providing that it is properly glazed) and so determines the lifetime of the unit in service.

The short-term properties of the sealant tend to be directly related to the amount of adhesion promoter present in the formulation. However, as the sealant becomes weathered the adhesion promoter in the sealant degrades, which can lead to detrimental effects on the long-term properties of the sealant (such as its bond with the glass interface). An excess of adhesion promoter can adversely affect the short-term properties of the sealant. The long-term properties of the sealant tend to benefit in proportion to the amount of adhesion promoter incorporated in the formulation, and which may be higher than desirable for the ideal short-term properties. There is a very fine balance between the amount of adhesion promoter the formulator can include in the composition to obtain the optimum between the short-term and long-term properties of the sealant. The formulator has to resolve conflicting requirements arising from both the nature of the application itself and limitations imposed by the characteristics of the raw materials used so as to produce a viable, balanced composition. In view of this fine balance, the glass sealant formulator is very reluctant indeed to make even minor adjustments to the amount of adhesion promoter employed in the sealant composition. Typically, a sealant will incorporate from 0.25 to 2.5 wt % adhesion promoter.

The formulations of compositions suitable for use as sealants useful in the manufacture of double glazing window units have developed over time, as formulators have obtained experience of the short-term and long-term performance of their products and the effects that varying the components and amounts thereof has on performance.

Whilst artificial weathering conditions may provide formulators with the ability to predict the long-term bonding properties of a particular sealant formulation, they tend to rely upon their actual experiences of the true performance of their products before they are prepared to give their customers written guarantees or other forms of assurances regarding the long-term performance of their products. This attitude has tended to make not only the glass sealant formulators but their customers as well very conservative and reluctant to change for fear of breaching their assurances, particularly with regard to the long-term performance properties of their products.

Glass sealants are generally complex formulations which tend to be flexible, substantially non-tacky solids at room temperature (18-20° C.). As the sealants are heated, for example up to their processing temperatures, which are typically more than 135° C. up to 220° C., e.g. 180° C., their physical characteristics slowly change from flexible, substantially non-tacky solids to very tacky, generally highly viscous fluids or pastes. Although the sealants demonstrate a softening point or range at temperatures from 0° C. to 220° C., under pressure during application they simply become more fluid as temperatures increase. The properties of the glass sealants make application of the compositions particularly difficult. Although such glass sealants are often commonly referred to as "hot melt" sealants, at no time do the formulations melt per se to form thin mobile liquids, for example as would be generally observed with a hot melt adhesive used in packaging. Although the glass sealants are substantially non-tacky solids at room temperature, they tend to adhere to surfaces when contacted with them for more than just a few seconds. This property of "blocking" leads to handling and storage problems, especially for storage at high ambient temperatures. Accordingly, historically, glass sealants have been supplied to manufacturers of double glazing window units in cardboard boxes which are either lined with silicone release paper or coated with a silicone resin. Either mode of packaging is expensive but, as it is more time consuming and labor-intensive to use silicone release paper, glass sealant formulators prefer to package their products in cardboard boxes coated on the lining with silicone resin.

Once the manufacturer of double glazing window units has removed the glass sealant from the packaging, the packaging is discarded. Being non-recyclable, the silicone coated cardboard is usually disposed of into land-fill sites. For environmental reasons, however, such form of disposal is highly undesirable. U.S. Pat. No. 5,373,682 discloses a method for the tackless packaging of hot melt adhesive. The method comprises pumping or pouring molten hot melt adhesive in liquid form into a cylindrical tube of plastic film, sealing the molten hot melt adhesive filled cylinder and allowing it to cool and solidify. The outer surface of the tube of plastic film is in direct contact with cooled water. The adhesive is pumped or poured at a temperature at or above the melting point of the plastic film. Although the inventors state that the coating of the adhesive with a plastic film provided no detrimental effects, the results of Table 1 clearly indicate that in both tests the sample with film had reduced adhesive properties compared to the control.

EP-A-0957029 discloses a method for packaging e.g. a hot melt adhesive by a process in which a liquid adhesive is co-extruded into a protective sheath of non-adhesive material and then subjecting the extruded product thus formed to a solidification process.

SUMMARY OF THE INVENTION

A packaged glass sealant product is provided that includes a glass sealant composition and a skin of thermoplastic polymeric material around at least a portion of the sealant composition. The packaged glass sealant can be used in the manufacture of double glazing window units. The packaged glass sealant may be used in a format which is more environmentally friendly than the use of silicone resin coated cardboard boxes without incurring detrimental effects on either the short-term or long-term properties of the sealant.

The glass sealant composition may comprise a) 5 to 65 wt % of butyl rubber or polyisobutylene rubber or EPDM rubber or mixtures thereof, b) 10 to 70 wt % inorganic filler, c) 0.25 to 5 wt % adhesion promoter, d) 0 to 30 wt % plasticizer, and e) 10 to 40 wt % tackifier resin. Component b) may be pigment or may contain pigment. From 0 to 0.5 wt % of additional antioxidant beyond that already present in the individual polymer components of the sealant composition may be added to the sealant composition. The glass sealant composition generally has a processing temperature for application that ranges from 70° C. to 220° C. The skin of thermoplastic polymeric material around at least a portion of said sealant composition preferably constitutes no more than 10 wt % of the total weight of said product, has a minimum film forming temperature of at least 50° C. and a softening point which is lower than the processing temperature for application of said sealant composition by a difference in temperature of more than 10° C.

In an embodiment, the processing temperature for application is greater than 135° C., and preferably 170° C. to 205° C. In this case, the 5 to 65 wt % butyl rubber or polyisobutylene rubber or EPDM rubber or mixtures thereof of the sealant composition may be present in admixture with a minor amount of one or more thermoplastic homo- or co-polymers including acrylic polymers, polyvinyl butyrals, polyamides, polyethylene, atactic polypropylene, poly-alpha-olefins, ethylene-acrylic acid copolymers, copolymers of ethylene and ethyl acrylate, or copolymers of ethylene and vinyl acetate. The butyl rubber can be a mixture of butyl rubber with a copolymer of ethylene and vinyl acetate.

In an embodiment, the processing temperature for application is more than 70° C. to 135° C. In this case, the 5 to 65 wt % butyl rubber or polyisobutylene rubber or EPDM rubber or mixtures thereof of the sealant composition may be present in admixture with a minor amount of one or more thermoplastic homo- or co-polymers including styrene-butadiene-styrene or styrene-isoprene-styrene block co-polymers.

In an embodiment, the sealant composition comprises: a) 10 to 35 wt % butyl rubber and up to 30 wt % of one or more thermoplastic homo- or co-polymers selected from acrylic polymers, polyvinyl butyrals, polyamides, polyethylene, atactic polypropylene, poly-alpha-olefins, ethylene-acrylic acid copolymers, copolymers of ethylene and ethyl acrylate and copolymers of ethylene and vinyl acetate, b) 10 to 45 wt % inorganic filler, c) 0.25 to 2.5 wt % adhesion promoter, d) 0 to 20 wt % plasticizer, and e) 10 to 35 wt % tackifier resin. Component b) may be pigment or may contain pigment. From 0 to 0.5 wt % of additional antioxidant beyond that already present in the individual polymer components of the sealant composition may be added to the sealant composition.

The packaged sealant product may be made using a method that includes a step of co-extruding the skin of thermoplastic polymeric material around the glass sealant composition.

DETAILED DESCRIPTION OF THE INVENTION

The present invention provides a packaged glass sealant product consisting of:
 a glass sealant composition having a processing temperature for application in the range of from greater than 70° C. up to 220° C. comprising: a) 5 to 65 wt % of butyl rubber or polyisobutylene rubber or EPDM rubber or mixtures thereof, optionally in admixture with a minor amount (i.e. less than 100 parts by weight per 200 parts by weight of total component a) ) of one or more thermoplastic homo- or co-polymers selected from acrylic polymers, polyvinyl-butyrals, polyamides, polyethylene, atactic polypropylene, poly-alpha-olefins, ethylene-acrylic acid copolymers, copolymers of ethylene and ethyl acrylate and copolymers of ethylene and vinyl acetate, styrene-butadiene-styrene and styrene-isoprene-styrene block co-polymers; b) 10 to 70 wt % inorganic filler including pigmentation; c) 0.25 to 5 wt % adhesion promoter; d) 0 to 30 wt % plasticizer; e) 10 to 40 wt % tackifier resin; and f) 0 to 1 wt % antioxidant above that already incorporated in the polymers; and
 a skin of thermoplastic polymeric material around said sealant composition, wherein said skin constitutes no more than 10 wt % of the total weight of said product, and wherein said polymeric material has:
  a minimum film forming temperature of at least 50° C. and
  a softening point which is lower than the processing temperature for application of said sealant composition by a difference in temperature of more than 10° C.

With respect to component a) comprised in the sealant composition which is included in the packaged product according to the invention, "butyl rubber" is the common designation for a copolymer of polyisobutylene with isoprene, usually with a quantity of about 1 to 2% of isoprene. The term EPDM designates a terpolymer of Ethylene, Propylene and a Diene Monomer.

The packaged products of the present invention are generally presented in the format of individual sausages or pillows or sections filled with sealant. These sausages or pillows or sections may be separate from one another or linked together as a plurality of sausages or pillows or sections. The skins of the products are non-blocking, and so do not adhere to each other or any other surfaces with which they may come into contact during handling, storing and transportation. In practice, the manufacturer of double glazing window units (and other insulating glass systems, such as triple glazing units) is provided with a container, preferably a recyclable container or a container formed of a recyclable material, housing a plurality of the packaged sealant products, The products are removed from the container and fed into the manufacturer's hot melt (or sealant) applicator where they are processed to seal the edge of a double glazing unit in a conventional manner: the manufacturer has no need to remove the polymeric skin from the sealant before processing.

The packaged glass sealant product of the present invention provides an environmentally acceptable alternative to packaging blocks of glass sealant in individual silicone resin coated cardboard boxes. Further, and most surprisingly, it has been found that the short-term performance properties of the sealants are not affected by the presence of the skin, which becomes melded into the sealant during processing by the manufacturer of double glazing window units, and that, contrary to the sealant formulator's expectations, there is no need to increase the amount of adhesion promoter in the sealant composition to accommodate for the presence of the skin in the sealant.

According to a preferred embodiment the sealant composition has a processing temperature for application of more than 135° C., preferably more than 150° C. Such a composition is often designated as a hot melt sealant. The processing temperature for application of the sealant is the temperature which the sealant formulator instructs the manufacturer of the double-glazed window units to employ in a hot melt applicator for correct extrusion and performance of the glass sealant.

In that case, the sealant composition advantageously comprises 5 to 65 wt % butyl rubber or polyisobutylene rubber or EPDM rubber or mixtures thereof optionally in admixture with a minor amount of one or more thermoplastic homo- or co-polymers selected from acrylic polymers, polyvinyl butyrals, polyamides, polyethylene, atactic polypropylene, poly-alpha-olefins, ethylene-acrylic acid copolymers, copolymers of ethylene and ethyl acrylate and copolymers of ethylene and vinyl acetate.

According to a further preferred embodiment the processing temperature for application of the sealant composition is from 170° C. to 205° C., for instance about 190° C. In that case component a) preferably comprises a mixture of butyl rubber with a copolymer of ethylene and vinyl acetate.

According to another preferred embodiment the sealant composition has a processing temperature for application of more than 70° C. to 135° C. Such a composition is often designated as a warm-applied hot melt sealant.

In that case, the sealant composition advantageously comprises 5 to 65 wt % butyl rubber or polyisobutylene rubber or EPDM rubber or mixtures thereof optionally in admixture with a minor amount of one or more thermoplastic homo- or co-polymers selected from styrene-butadiene-styrene and styrene-isoprene-styrene block co-polymers.

Warm-applied hot melt sealants, also known as "Warm melt" products, which crosslink through contact with moisture from the air generally contain silylated polyurethane prepolymers or other silylated polymers such as silylated polyisobutylene or silylated ethylene vinyl acetate. Examples of crosslinking warm-applied hot melt sealants of this kind are disclosed in U.S. Pat. No. 6,121,354.

Inorganic filler b) comprised in the sealant composition can be selected among talc, clay, silica, calcium metasilicate, aluminum trihydrate, calcium magnesium carbonate, calcium carbonate (coated or uncoated), titanium dioxide and carbon black. Calcium carbonate is a preferred filler.

Adhesion promoters c) are usually selected for example among functional silanes or derivatives containing functional groups such as isocyanato, mercapto, methacryl, glycidyl or amino. Amino or glycidyl functional silanes are preferred. A more particularly preferred sealant composition comprises:
a) 10 to 35 wt % butyl rubber and optionally up to 30 wt % of one or more thermoplastic homo- or co-polymers selected from acrylic polymers, polyvinyl butyrals, polyamides, polyethylene, atactic polypropylene, poly-alpha-olefins, ethylene-acrylic acid copolymers, copolymers of ethylene and ethyl acrylate and copolymers of ethylene and vinyl acetate;
b) 10 to 45 wt % inorganic filler including pigmentation; c) 0.25 to 2.5 wt % adhesion promoter; d) 0 to 20 wt % plasticizer; e) 10 to 35 wt % tackifier resin; and f) 0 to 0.5 wt % additional antioxidant.

Advantageously, the sealant composition is solvent-free.

The glass sealant composition such as defined previously is prepared by simple mixing of its ingredients. Many of these glass sealant compositions are commercially available. These will be well known to those skilled in the art. The thermoplastic polymeric materials useful for forming the skin which completely sheaths the sealant composition has a minimum film forming temperature of at least 50° C., preferably at least 55° C., thereby to ensure that the skin is substantially non-blocking and is substantially non-tacky to other surfaces during storage, handling and transportation. More preferably, the minimum film forming temperature of the plastics material is at least 70° C.

The minimum film forming temperature (MFFT) is the lowest temperature at which it is necessary to heat the thermoplastic polymeric material, under solid granules form which are placed on top of a flat piece of sealant, in order that said granules result after cooling to room temperature in an unbroken film coating said flat piece. This MFFT is determined by heating the granules of the thermoplastic polymeric material (which are placed on top of a flat piece of sealant) in an oven at different temperatures. The sealant is typically supported on siliconized kraft paper. The coating is stroked gently, using a suitable spatula if required, to assist evaluation.

The softening point is measured by the Ring and Ball method well known to one skilled in the art, as described for instance in ASTM D36.

The thermoplastic polymeric materials must be suitable for purpose and, as would be appreciated by a person skilled in the art, accordingly depend upon the composition and processing temperature of sealant composition. These thermoplastic polymeric materials comprise polymers and copolymers which are substantially compatible with the glass sealant composition. In general, but not exclusively, these polymers will be olefinic or hydrocarbon based, such as ethylene based polymers and copolymers, for example ethylene methyl acrylate and ethylene vinyl acetate. Olefinic polymers that are suitable include polyolefins, such as polyethylene and polypropylene, and poly-alpha-olefins. Ethylene based polymers, such as ethylene butyl acrylate copolymers, random ethylene-acrylic ester-maleic anhydride terpolymers and random acrylic ester glycidyl methacrylate terpolymers may be used. Hydrocarbon rubbers such as butyl rubbers, polyisobutylene and ethylene-propylene rubber may also be used, optionally in combination with other materials to facilitate their co-extrusion. A number of suitable polymeric materials are disclosed in U.S. Pat. No. 5,373,682. Examples of suitable commercial materials useful in the preparation of the skins include: Atofina Evatane 18-150, ExxonMobil Escorene LD655/EVA (72/28), and Bostik Findley SA Enrobage FP2. According to a preferred embodiment, the polymeric material is selected among a copolymer of ethylene and vinyl acetate, and a copolymer of ethylene and butyl acrylate. In addition to the above mentioned polymers, the polymeric materials of the skin may contain other ingredients, for example one or more of: antioxidants; polymers, copolymers including terpolymers and blends thereof intended to increase film strength; waxes to reduce viscosity; flow modifiers or thixotropes to aid film formation; fillers; and pigments.

It is preferred that the polymeric material contains no functional ingredients which are capable of reacting with the constituents of the glass sealant composition, as a viscous interlayer may be formed between the skin and the sealant composition which could result in applicator blockage.

In a particular embodiment of the present invention, the polymeric material includes one or more components which have an affinity for glass and/or metals, e.g. aluminum, used in the construction of sealed units. The skin should comprise no more than 10 wt %, preferably no more than 7.5 wt %, more preferably no more than 5 wt %, and most preferably no more than 2 wt %, of the packaged sealant product. In one embodiment, the skin constitutes from 0.2 to 1.0 wt % of the packaged sealant product.

The skin is preferably insoluble in water. More preferably, the moisture vapor transmission rate of the skin is no greater than that of the glass sealant composition.

To ensure the skin blends into the sealant composition during processing by the manufacturer of the double glazing units, the polymeric material which forms the skin should not be crosslinked to any appreciable extent. Crosslinking tends to lead to the formation of polymer strings that may block the pathways or nozzle of the applicator at the sealed units' manufacturers.

The skin is preferably formed as a single layer of polymeric material, although multiple layered skins may be employed.

The present invention also concerns a method of manufacturing the packaged sealant product such as defined previously comprising co-extruding the skin around the glass sealant composition. Typically the insulating glass sealant is extruded at 125 to 160° C. and coated by co-extrusion with the polymeric skin at 180 to 200° C. The co-extruded product is prevented from adhering to itself whilst hot by immersion in cold water. The co-extruded product is pinched mechanically to create individual sausages. The pinching action hermetically seals the hot melt insulating glass sealant within the skin. After cooling the sausages are air-dried prior to packaging into a recyclable outer container, for example a cardboard carton. For example, the process disclosed in U.S. Pat. No. 5,373,682 for the preparation of non-blocking hot-melt adhesives may be employed with suitable adaptation for sealant compositions to replace the adhesives.

Alternatively, the process disclosed in EP-A-957029 may also be employed with suitable adaptation for sealant compositions to replace the adhesive.

In another embodiment, the skin is formed by shrink wrapping a sheet of polymeric material around the sealant composition. For example, the processes disclosed in U.S. Pat. No. 5,373,682 and EP-A-469564 may be employed with suitable adaptation for sealant compositions to replace the adhesives.

The invention will now be described further by reference to the following worked examples which are not intended to be limiting on the scope of the invention set out in the claims.

Test Procedures A variety of different tests were used to determine whether the invention (Examples 2 and 3) had any significant deleterious effects on the short- and long-term performance of sealed window units, in comparison with those made from glass sealant packaged conventionally (Example 1). In particular these included tests based upon the following methods:

Short-term tests

EN 1279-6 Glass in building—Insulating glass units—Part 6: Factory production control and periodic tests;

Annex B Periodic testing and inspections B.4.2 Short climate test Annex C Fogging test Figure C.2 (British)

Annex F Seals, adherence measurements F.4.2 Butterfly test

Long-term tests

EN 1279-2 Glass in building—Insulating glass units—Part 2: Long term test method and requirement for moisture penetration EN 1279-6 Fogging test extended from one week to 6 months

EXAMPLE 1

Comparative

Use was made of a glass sealant composition comprising about: 20% of butyl rubber, 10% of an Ethylene Vinyl Acetate co-polymer, 25% of tackifier resin, 30% of inorganic fillers consisting essentially of calcium carbonate, 1% of adhesion promoter of an amino functional silane type and 10% of plasticizer (% by weight).

7 kg blocks of this glass sealant composition were fed into the hopper of a commercial hot melt applicator. The applicator was used conventionally for preparing 502 mm×352 mm double glazing units for test. The hot melt applicator heats the sealant to a temperature between 180 and 195° C. and mixes the composition as the highly viscous fluid progresses from the hopper via a gear pump along heated pipework to an application gun. When the hot sealant reaches the applicator gun, it is extruded through a nozzle at typically 187° C. and is applied into the cavity around the periphery of the double glazing unit assembly in such a way so as to form a hermetically sealed, insulating glass unit.

For purposes of test, double glazing units and butterfly test specimens are made in accordance with the constructional requirements of EN 1279. Application of the sealant is made in accordance with normal practice. The width of the cavity is nominally 12 mm. Both panes of glass are of nominally 4 mm thick clear float glass. The depth of cavity seal is 7 mm. The panes of glass are spaced apart using an aluminum spacer frame assembly. The spacer bar tube, which is sealed into the unit, contains an amount of a suitable commercial desiccant based on molecular sieve sufficient to keep the interior of the unit dry to the required standard. Sealed units and test specimens are allowed to cool to room temperature and preconditioned in accordance with the requirements of EN 1279 prior to test.

The results of short- and long-term tests were as follows:
EN 1279-6 Short climate test Moisture penetration index=0.011.

Conformed to requirement of 0.085 maximum.

EN 1279-6 Fogging test No visual condensation. Conformed to requirement.

EN 1279-6 Butterfly adhesion test No adhesion failure of the sealant from the glass.

Conformed to requirement. In addition there was no adhesion failure to aluminum, which is not a normative requirement of the Standard because of the high stresses applied. EN 1279-2 Long climate test Moisture penetration index=0.037. Conformed to requirement of 0.16 maximum. Extended EN 1279-6 Fogging test No visual condensation after 6 months UV exposure.

This is not a requirement of the Standard but is indicative of performance.

EXAMPLE 2

Preparation of Packaged Glass Sealant

Commercially available co-extrusion equipment described in EP-A-0957029 was used in the preparation of pillows of packaged glass sealant containing the glass sealant composition of example 1.

The coating material used was Bostik Enrobage FP2 manufactured by Bostik Findley S A, France. Bostik Enrobage FP2 is a preparation based on waxes and a copolymer of ethylene and vinyl acetate. It has a Ring & Ball softening point of 80 to 100° C. and a minimum film forming temperature of around 125° C. Molten glass sealant (at a temperature comprised between 125 and 160° C.) was co-extruded with the coating material (at a temperature comprised between 180 to 200° C.) into water (at a temperature of approximately 8° C.). The co-extruded product covered by a continuous skin of the coating was mechanically pinched to form nominally 100 mm long×35 g pillows in a string. Following water-cooling and air drying, the pillows were mechanically separated prior to filling into cardboard cartons. The pillows did not stick together or block upon storage in the cartons because the coating was non-tacky. Hence the principle may be applied to other sections such as slabs more convenient for packaging.

The skin was between 0.5-2 wt % of the pillows and found to be non-blocking and non-tacky at a temperature of 55° C.

EXAMPLE 3

The packaged glass sealant formed in Example 2 above was then evaluated as in Example 1, except that a charge of nominally 35 g pillows of coated glass sealant was introduced into the hopper of a commercial hot melt applicator. Because of the time lost whilst purging out a single applicator, a second machine was put into use to allow the trial of the packaged glass sealant to take place on the same day as the conventional product. Climatic conditions (ambient temperature 20-22° C., barometric pressure 1025 mB, Relative Humidity 58%) were the same as for "gunning" the conventional blocks. Approximately 25 Kg of packaged glass sealant were used to charge the applicator. The application temperature and other working conditions used were as close to the temperature and working conditions employed in Example 1 as was practical. The sealant extruded from the applicator was then evaluated as for Example 1 in accordance with the Test Procedure outlined above and after following identical preconditioning.

The results of short- and long-term tests for the packaged glass sealant were as follows:

EN 1279-6 Short climate test: Moisture penetration index=0.012. Conformed to requirement of 0.085 maximum.

EN 1279-6 Fogging test No visual condensation. Conformed to requirement.

EN 1279-6 Butterfly adhesion test No adhesion failure of the sealant from the glass.

Conformed to requirement. In addition there was no adhesion failure to aluminum, which is not a normative requirement of the Standard because of the high stresses applied. EN 1279-2 Long climate test Moisture penetration index=0.030.

Conformed to requirement of 0.16 maximum.

Extended EN 1279-6 Fogging test No visual condensation after 6 months UV exposure. This is not a requirement of the Standard but is indicative of performance.

Comparison of the short- and long-term results obtained in Example 1 with the results obtained in Example 3 indicates no deleterious effects, demonstrating that the presence of the skin blended into the sealant composition has no potential deleterious effects on the performance of the sealant. As the amount of adhesion promoter present in both sealant compositions was the same, this suggests that surprisingly there are no potential deleterious effects on the performance of the sealant as a consequence of the method of packaging.

Although the invention has been described with reference to particular embodiments, it is to be understood that these embodiments are merely illustrative of the principles and applications of the present invention. It is therefore to be understood that numerous modifications may be made relative to the illustrative embodiments and that other arrangements may be devised without departing from the spirit and scope of the present invention as defined by the appended claims.

The invention claimed is:

1. A glass sealant product comprising:
a co-extruded glass sealant and a thermoplastic polymeric skin,
said glass sealant comprising:
   a) 5 to 65 wt % of butyl rubber or polyisobutylene rubber or EPDM rubber or mixtures thereof,
   b) 10 to 70 wt % inorganic filler,
   c) 0.25 to 5 wt % adhesion promoter,
   d) 0 to 30 wt % plasticizer, and
   e) 10 to 40 wt % tackifier resin,
wherein the glass sealant has a processing temperature for application from 70° C. to 220° C.; and said thermoplastic polymeric skin surrounding at least a portion of said sealant and hermetically sealing said glass sealant by the skin, wherein said skin constitutes no more than 10 wt % of the total weight of said product, and wherein said thermoplastic polymeric skin has a minimum film forming temperature of at least 50° C. and a softening point which is lower than the processing temperature for application of said sealant by a difference in temperature of more than 10° C.

2. The product of claim 1, wherein the processing temperature for application is greater than 135° C.

3. The product of claim 2, wherein the 5 to 65 wt % butyl rubber or polyisobutylene rubber or EPDM rubber or mixtures thereof of the sealant is in admixture with a minor amount of one or more thermoplastic homo- or co-polymers including acrylic polymers, polyvinyl butyrals, polyamides, polyethylene, atactic polypropylene, poly-alpha-olefins, ethylene-acrylic acid copolymers, copolymers of ethylene and ethyl acrylate, or copolymers of ethylene and vinyl acetate.

4. The product of claim 2, wherein the processing temperature for application of the sealant is from 170° C. to 205° C.

5. The product of claim 4, wherein component a) comprises a mixture of butyl rubber with a copolymer of ethylene and vinyl acetate.

6. The product of claim 1, wherein the sealant has a processing temperature for application of more than 70° C. to 135° C.

7. The product of claim 6, wherein the 5 to 65 wt % butyl rubber or polyisobutylene rubber or EPDM rubber or mixtures thereof of the sealant is in admixture with a minor amount of one or more thermoplastic homo- or co-polymers including styrene-butadiene-styrene or styrene-isoprene-styrene block co-polymers.

8. The product according to claim 1, wherein the sealant comprises:
   a) 10 to 35 wt % butyl rubber and up to 30 wt % of one or more thermoplastic homo- or co-polymers selected from acrylic polymers, polyvinyl butyrals, polyamides, polyethylene, atactic polypropylene, poly-alpha-olefins, ethylene-acrylic acid copolymers, copolymers of ethylene and ethyl acrylate and copolymers of ethylene and vinyl acetate,
   b) 10 to 45 wt % inorganic filler,
   c) 0.25 to 2.5 wt % adhesion promoter,
   d) 0 to 20 wt % plasticizer, and
   e) 10 to 35 wt % tackifier resin.

9. The product according to claim 1, further comprising an amount of up to 0.5 wt % of antioxidant.

10. The product of claim 1, wherein the processing temperature for application is more than 150° C.

11. The product of claim 10, wherein the 5 to 65 wt % butyl rubber or polyisobutylene rubber or EPDM rubber or mixtures thereof of the sealant is in admixture with a minor amount of one or more thermoplastic homo- or co-polymers including acrylic polymers, polyvinyl butyrals, polyamides, polyethylene, atactic polypropylene, poly-alpha-olefins, ethylene-acrylic acid copolymers, copolymers of ethylene and ethyl acrylate, or copolymers of ethylene and vinyl acetate.

12. The product of claim 1, wherein the processing temperature for application is from 170° C. to 205° C.

13. The product of claim 1, wherein component b) includes pigment.

14. The product of claim 1, wherein the packaged product is in the form of pillows having mechanically pinched glass sealant and skin at the ends.

15. The product of claim 14, wherein the processing temperature for application is greater than 150° C.

16. The product of claim 1, wherein the processing temperature for application is greater than 150-220° C.

17. A glass sealant product comprising:

a co-extruded glass sealant and a thermoplastic polymeric skin, said glass sealant comprising a butyl rubber or polyisobutylene rubber or EPDM rubber, an inorganic filler, an adhesion promoter, and a tackifier resin and having an application temperature from 70° C. to 220° C.;

said thermoplastic polymeric skin surrounding at least a portion of said sealant and hermetically sealing said glass sealant by the skin, wherein said skin constitutes no more than 10 wt % of the total weight of said product, and wherein said thermoplastic polymeric skin has a minimum film forming temperature of at least 50° C. and a softening point which is lower than the processing temperature for application of said sealant by a difference in temperature of more than 10° C.

18. The product of claim 17, wherein adhesion promoter constitutes from 0.25 to 2.5 wt % of the glass sealant.

* * * * *